(12) United States Patent
Johansson et al.

(10) Patent No.: US 10,721,703 B2
(45) Date of Patent: Jul. 21, 2020

(54) NOTIFICATION OF ONGOING MULTILATERATION TIMING ADVANCE (MTA) PROCEDURE TO A SERVING GPRS SUPPORT NODE (SGSN)

(71) Applicant: TELEFONAKTIEBOLAGET L M ERICSSON (PUBL), Stockholm (SE)

(72) Inventors: Nicklas Johansson, Brokind (SE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 53 days.

(21) Appl. No.: 15/886,616

(22) Filed: Feb. 1, 2018

(65) Prior Publication Data

US 2018/0220389 A1     Aug. 2, 2018

Related U.S. Application Data

(60) Provisional application No. 62/453,843, filed on Feb. 2, 2017.

(51) Int. Cl.
| | |
|---|---|
| *H04W 56/00* | (2009.01) |
| *H04W 76/27* | (2018.01) |
| *H04W 72/04* | (2009.01) |
| *H04W 64/00* | (2009.01) |
| *H04W 68/00* | (2009.01) |

(52) U.S. Cl.
CPC ..... *H04W 56/0045* (2013.01); *H04W 56/005* (2013.01); *H04W 64/00* (2013.01); *H04W 72/042* (2013.01); *H04W 72/0433* (2013.01); *H04W 76/27* (2018.02); *H04W 68/00* (2013.01)

(58) Field of Classification Search
None
See application file for complete search history.

(56) References Cited

U.S. PATENT DOCUMENTS

| | | |
|---|---|---|
| 6,317,421 B1 | 11/2001 | Wilhelmsson et al. |
| 6,711,143 B1 | 3/2004 | Balazinski et al. |
| 2001/0009544 A1 | 7/2001 | Vanttinen et al. |

(Continued)

OTHER PUBLICATIONS

"3GPP TS 48.018 V14.1.0 (Dec. 2016)", 3rd Generation Partnership Project; Technical Specification Group Radio Access Network; General Packet Radio Service (GPRS); Base Station System (BSS), (Year: 2016).*

(Continued)

*Primary Examiner* — Gregory B Sefcheck
*Assistant Examiner* — Majid Esmaeilian

(57) ABSTRACT

The present disclosure describes various techniques for enabling a Base Station System (BSS) to provide a Serving GPRS Support Node (SGSN) with an indication, e.g., in the form of a flag or a timer, within a BSS General Packet Radio Service (GPRS) Protocol (BSSGP) POSITION-COMMAND Protocol Data Unit (PDU) that a target wireless device is to perform a Multilateration Timing Advance (MTA) procedure. The SGSN upon receipt of the BSSGP POSITION-COMMAND PDU with the indication, e.g., in the form of a flag or a timer, can start a timer during which the SGSN will suspend downlink data delivery and paging to the target wireless device while the target wireless device is performing the MTA procedure.

6 Claims, 11 Drawing Sheets

(56) References Cited

U.S. PATENT DOCUMENTS

| | | | |
|---|---|---|---|
| 2005/0007980 A1 | 1/2005 | Landais et al. | |
| 2006/0293066 A1* | 12/2006 | Edge | H04W 4/02 455/456.3 |
| 2012/0063464 A1 | 3/2012 | Mehta | |
| 2012/0295623 A1* | 11/2012 | Siomina | G01S 5/0263 455/436 |
| 2016/0249193 A1* | 8/2016 | Edge | H04W 4/90 |

OTHER PUBLICATIONS

Ericsson LM, "New Work Item on Positioning Enhancements for GERAN", RP-161260, Orange, MediaTek Inc., Sierra Wireless, Nokia, RAN#72, Jun. 13-16, 2016.

Ericsson LM, "Positioning Enhancements for GERAN—introducing Timing Advance trilateration", RP-161034, RAN#72, Jun. 13-16, 2016.

LG Electronics et al. "Revision of SI: Feasibility Study on LTE-based V2X Services" RP-161263, CR 43.059-0081 RAN6#2, Jun. 13-16, 2016.

Ericsson LM, "Introduction of Multilateration", draft CR 41059, 1st telco on Positioning Enhancements for GERAN, Feb. 13-17, 2017.

Nokia, "Serving Cell TA Estimation for Multilateration Positioning", R6-170045, 3GPP TSG RAN WG6 #3, Feb. 13-17, 2017, the whole document.

3GPP TS 48.018 v 14.1.0 "Base Station System (BSS)—Serving GPRS Support Node (SGSN)", BSS GPRS Protocol (BSSGP), Dec. 2016, the whole document.

LM Ericsson: Multilateration Procedure—TA Only, 3GPP Draft; R6-160273—Multilateration Procedure—TA Only (WAS R6-160261), 3rd Generation Partnership Project (3GPP), No. Reno, Nevada USA; 20161114-20161118 Nov. 18, 2016 (Nov. 18, 2016), XP051198955, p. 17-p. 18.

Ericsson: "On timing advance based multi-leg positioning for NB-IoT", 3GPP Draft; R1-167426—On Timing Advance Based Multi-Leg Positioning for NB-IoT, 3rd Generation Partnership Project (3GPP), vol. RAN WGl, No. Gothenburg, Sweden; Aug. 21, 2016 (Aug. 21, 2016), the whole document.

R6-160274 (Revision of R6-160263), entitled "CR 43.059-0081 rev 3 Introduction of Multilateration," Source: Ericsson LM, 3GPP TSG-RAN6 Meeting #2, Reno, Nevada, U.S.A., Nov. 14-18, 2016, the whole document.

LM Ericsson, "Provisioning of a Multilateration timer to the SGSN", RAN WG6 Meeting#3, Feb. 13-17, 2017, Athens, Greece, R6-170002, pp. 1-4.

3rd Generation Partnership Project; Technical Specification Group Radio Access Network; Functional stage 2 description of Location Services (LCS) in GERAN (Release 14), 3GPP Standard; Technical Specification ; 3GPP TS 43.059, vol. RAN WG6, No. V14.0.0, Mar. 20, 2017 (Mar. 20, 2017), pp. 1-82.

R6-160263 (Revision of R6-160149), 3GPP TSG-RAN6 Meeting #2, entitled "CR 43.059-0081 rev 2 Introduction of Multilateration," Source: Ericsson LM, Reno, Nevada, U.S.A., Nov. 14-18, 2016, the whole document.

3GPP TS 43.059 V13.2.0 (May 2016), 3rd Generation Partnership Project; Technical Specification Group GSM/EDGE Radio Access Network; Functional stage 2 description of Location Services (LCS) in GERAN (Release 13), dated Jun. 1, 2016, the whole document.

3GPP TS 48.071 V13.0.0 (Jan. 2016), 3rd Generation Partnership Project; Technical Specification Group GSM/EDGE Radio Access Network; Location Services (LCS); Serving Mobile Location Centre—Base Station System (SMLC-BSS) interface; Layer 3 specification (Release 13), dated Jan. 6, 2016, the whole document.

3GPP TS 49.031 V13.0.0 (Jan. 2016),3rd Generation Partnership Project; Technical Specification Group GSM/EDGE Radio Access Network; Location Services (LCS); Base Station System Application Part LCS Extension (BSSAP-LE) (Release 13), dated Jan. 6, 2016, the whole document.

LM Ericsson, "Analysis of MS Transmission Accuracy", RAN WG6 telco #1 on ePOS_GERAN, dated Dec. 15, 2016, the whole document.

3GPP TS 44.018 V14.0.0 (Dec. 2016), 3rd Generation Partnership Project; Technical Specification Group Radio Access Network; Mobile radio interface layer 3 specification; GSM/EDGE Radio Resource Control (RRC) protocol (Release 14), dated Dec. 23, 2016 , the whole document.

* cited by examiner

POSITION-COMMAND PDU CONTENT 208

| INFORMATION ELEMENTS | TYPE/REFERENCE | PRESENCE | FORMAT | LENGTH |
|---|---|---|---|---|
| PDU TYPE | PDU TYPE/11.3.26 | M | V | 1 |
| TLLI | TLLI/11.3.35 | M | TLV | 6 |
| BVCI (PCU-PTP) | BVCI/11.3.6 | M | TLV | 4 |
| RRLP FLAGS (500) | RRLP FLAGS/11.3.60 | M | TLV | 3 |
| RRLP APDU (204) | RRLP APDU/11.3.49 | M | TLV | 3-? |

FIG. 3
(PRIOR ART)

RRLP APDU IE 204

| | 8 | 7 | 6 | 5 | 4 | 3 | 2 | 1 |
|---|---|---|---|---|---|---|---|---|
| OCTET 1 | IEI | | | | | | | |
| OCTET 2, 2a | LENGTH INDICATOR | | | | | | | |
| OCTET 3-? | THE REST OF THE INFORMATION ELEMENT CONTAINS AN EMBEDDED RRLP MESSAGE WHOSE CONTENT AND ENCODING ARE DEFINED ACCORDING TO THE 3GPP TS 44.031. THE RRLP PROTOCOL IS NOT OCTET ALIGNED. THEREFORE, THE UNUSED BITS IN THE LAST OCTET ARE PADDED WITH ZEROES. | | | | | | | |

FIG. 4
(PRIOR ART)

RRLP FLAGS IE 500

| | 8 | 7 | 6 | 5 | 4 | 3 | 2 | 1 |
|---|---|---|---|---|---|---|---|---|
| OCTET 1 | IEI | | | | | | | |
| OCTET 2, 2a | LENGTH INDICATOR | | | | | | | |
| OCTET 3 | SPARE | | | | | | | FLAG 1 |

FIG. 5
(PRIOR ART)

POSITION-COMMAND PDU CONTENT 708

| INFORMATION ELEMENTS | TYPE/REFERENCE | PRESENCE | FORMAT | LENGTH |
|---|---|---|---|---|
| PDU TYPE | PDU TYPE/11.3.26 | M | V | 1 |
| TLLI | TLLI/11.3.35 | M | TLV | 6 |
| BVCI (PCU-PTP) | BVCI/11.3.6 | M | TLV | 4 |
| RRLP FLAGS | RRLP FLAGS/11.3.60 | M | TLV | 3 |
| RRLP APDU | RRLP APDU/11.3.49 | M | TLV | 3-? |
| MULTILATERATION TIMER | MULTILATERATION TIMER/11.3.xxx | O | TLV | 3 |

(UNMODIFIED) / (MODIFIED)
500/735: RRLP FLAGS
702: RRLP APDU
720: MULTILATERATION TIMER

FIG. 7

MULTILATERATION TIMER IE 720

| | 8 | 7 | 6 | 5 | 4 | 3 | 2 | 1 |
|---|---|---|---|---|---|---|---|---|
| OCTET 1 | IEI ||||||||
| OCTET 2, 2a | LENGTH INDICATOR ||||||||
| OCTET 3 | SPARE | | | | | MPM TIMER | | |

709

Multilateration Positioning Method (MPM) Timer (bits 1, 2 and 3 of octet 3)

This field indicates a MTA specific timer value that indicates the longest expected duration of the MTA procedure. The SGSN shall suspend data delivery to the device associated with the TLLI for the duration of the timer.

```
3 2 1
0 0 0    2 seconds
0 0 1    4 seconds
0 1 0    6 seconds
0 1 1    8 seconds
1 0 0   10 seconds
1 0 1   15 seconds
1 1 0   20 seconds
1 1 1   25 seconds
```

FIG. 8

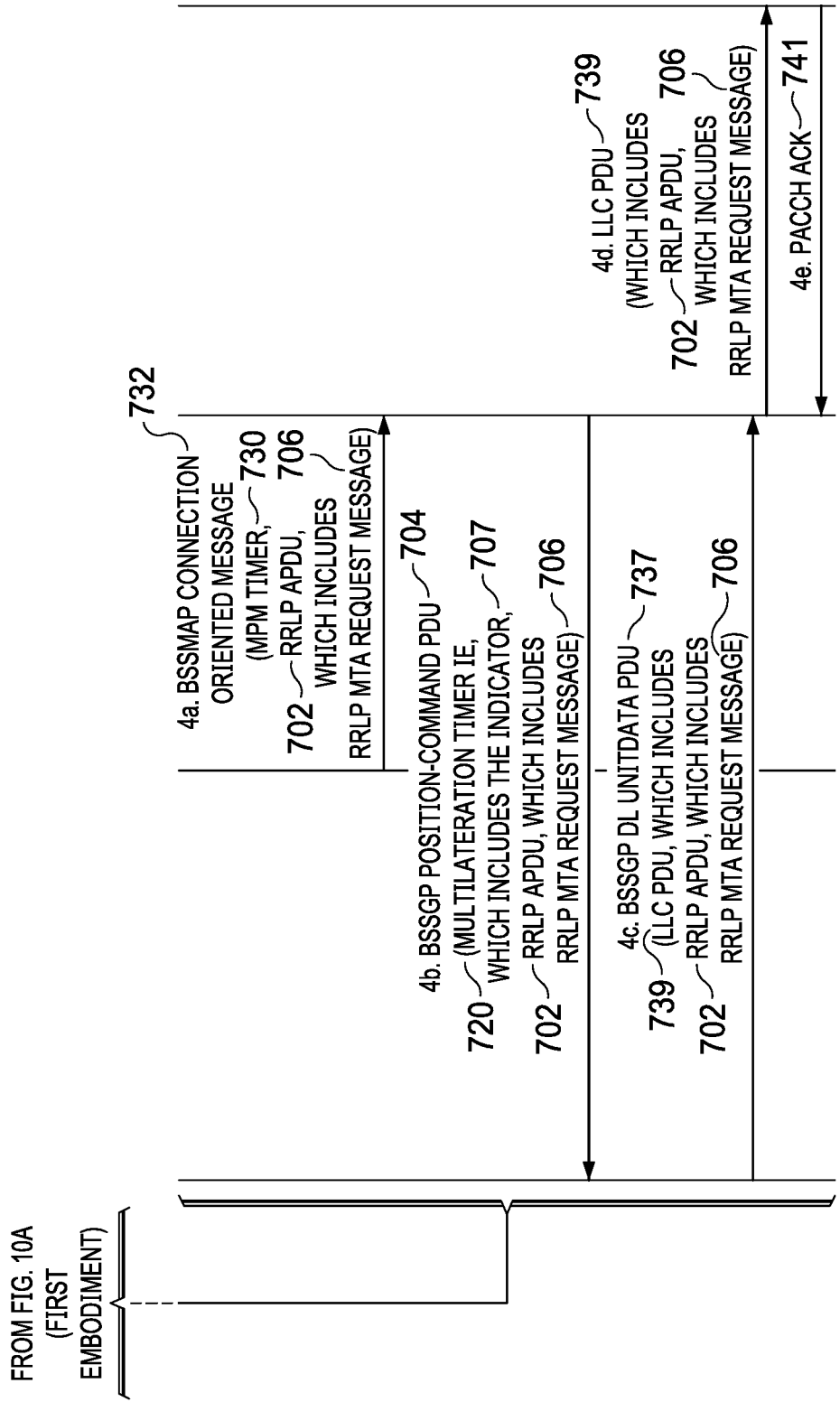
FIG. 10B1

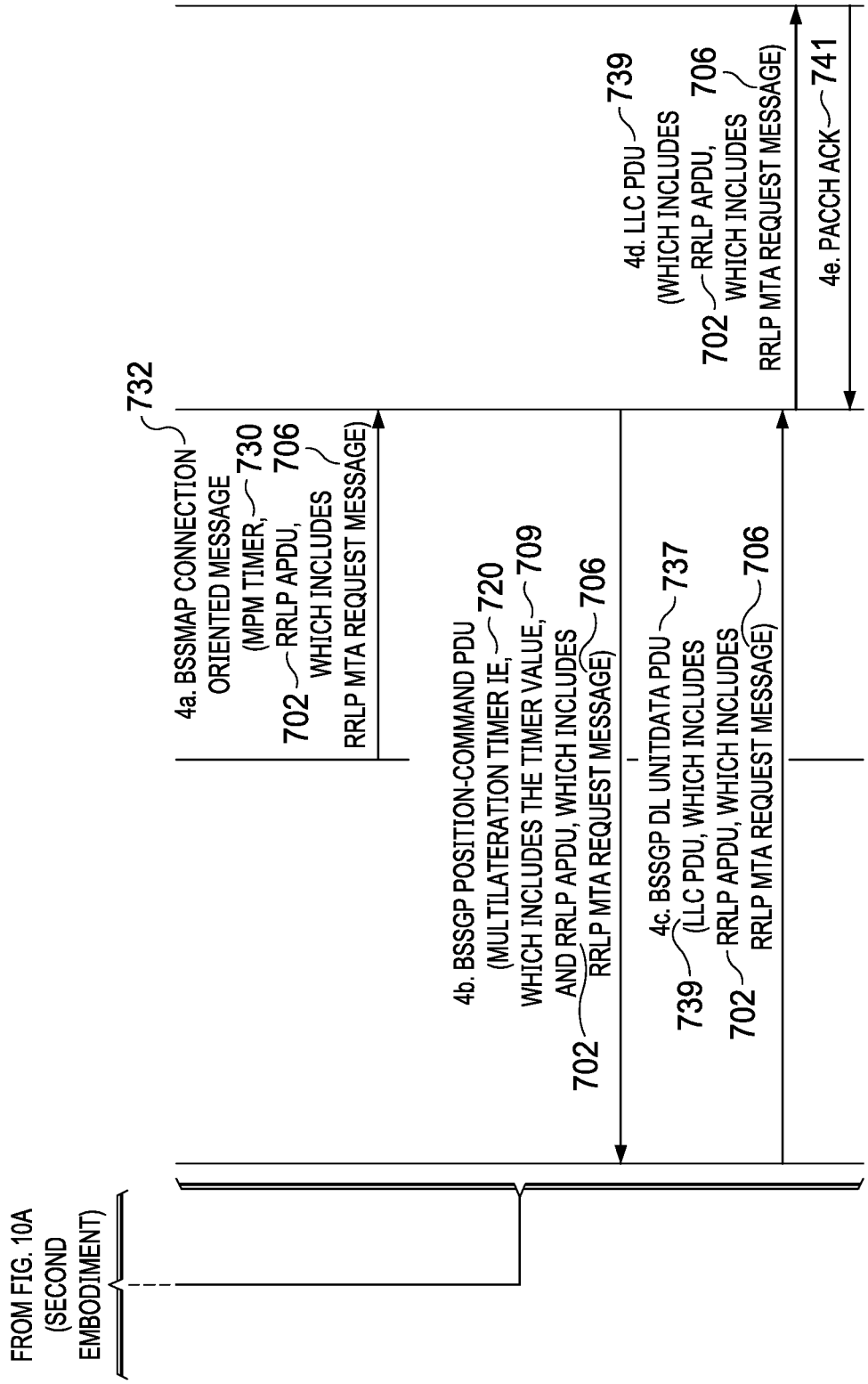
FIG. 10B2

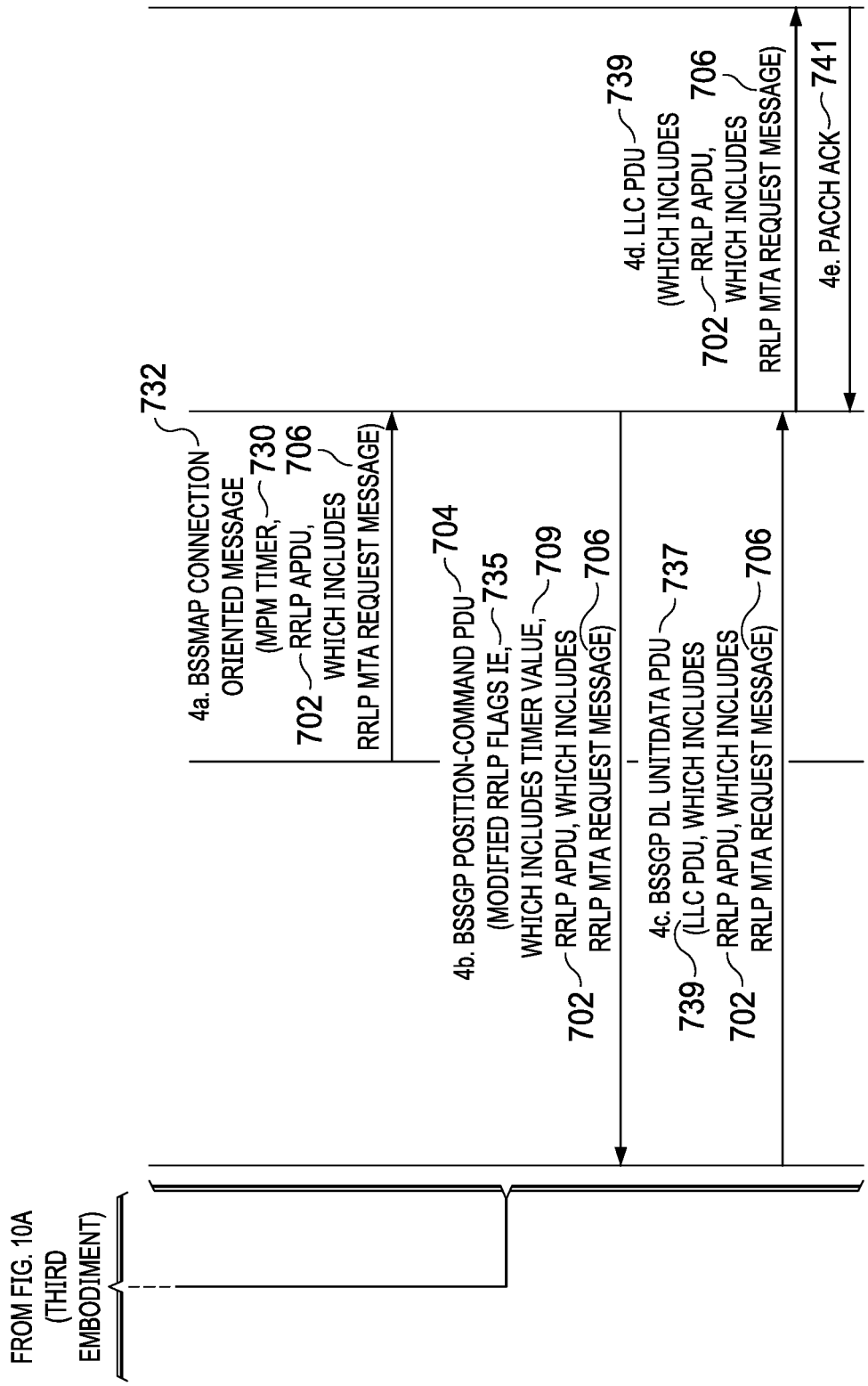
FIG. 10B3

NOTIFICATION OF ONGOING MULTILATERATION TIMING ADVANCE (MTA) PROCEDURE TO A SERVING GPRS SUPPORT NODE (SGSN)

CLAIM OF PRIORITY

This application claims the benefit of priority to U.S. Provisional Application Ser. No. 62/453,843, filed on Feb. 2, 2017, the entire contents of which are hereby incorporated herein by reference for all purposes.

RELATED PATENT APPLICATION

This application is related to the co-filed U.S. patent application Ser. No. 15/886,727 entitled "Notification of Delivery of a RRLP Multilateration Timing Advance Request Message to a Base Station Subsystem (BSS)", now U.S. Pat. No. 10,477,502, which claims the benefit of priority to U.S. Provisional Application Ser. Nos. 62/453, 843 and 62/456,991, respectively filed on Feb. 2, 2017 and Feb. 9, 2017. The entire contents of each of these documents are hereby incorporated herein by reference for all purposes.

TECHNICAL FIELD

The present disclosure relates generally to the wireless telecommunications field and, more particularly, to various techniques for enabling a Base Station System (BSS) to provide a Serving GPRS Support Node (SGSN) with an indication, e.g., in the form of a flag or a timer, within a BSS General Packet Radio Service (GPRS) Protocol (BSSGP) POSITION-COMMAND Protocol Data Unit (PDU) that a target wireless device is to perform a Multilateration Timing Advance (MTA) procedure. The SGSN upon receipt of the BSSGP POSITION-COMMAND PDU with the indication, e.g., in the form of a flag or a timer, can start a timer during which the SGSN will suspend downlink data delivery and paging to the target wireless device while the target wireless device is performing the MTA procedure.

BACKGROUND

The following abbreviations and term are herewith defined, at least some of which are referred to within the following description of the present disclosure.
3GPP 3rd-Generation Partnership Project
APDU Application Protocol Data Unit
ASIC Application Specific Integrated Circuit
BSS Base Station Subsystem
BBSLAP Base Station Subsystem Location Services Assistance Protocol
BTS Base Transceiver Station
CN Core Network
DL Downlink
DSP Digital Signal Processor
EC Extended Coverage
EC-GSM Extended Coverage Global System for Mobile Communications
eNB Evolved Node B
EDGE Enhanced Data rates for GSM Evolution
EGPRS Enhanced General Packet Radio Service
GSM Global System for Mobile Communications
GERAN GSM/EDGE Radio Access Network
GPRS General Packet Radio Service
IE Information Element
IoT Internet of Things
LTE Long-Term Evolution
MME Mobility Management Entity
MPM Multilateration Positioning Method
MS Mobile Station
MTA Multilateration Timing Advance
MTC Machine Type Communications
NB-IoT Narrow Band Internet of Things
PACCH Packet Associated Control Channel
PDN Packet Data Network
PDU Protocol Data Unit
PLMN Public Land Mobile Network
PS Packet Switched
RAN Radio Access Network
RLC Radio Link Control
RRLP Radio Resource Location Services Protocol
SCCP Signalling Connection Control Part
SGSN Serving GPRS Support Node
SMLC Serving Mobile Location Center
TA Timing Advance
TBF Temporary Block Flow
TS Technical Specification
TSG Technical Specification Group
UE User Equipment
UL Uplink
WCDMA Wideband Code Division Multiple Access
WiMAX Worldwide Interoperability for Microwave Access Extended Coverage: The general principle of extended coverage is that of using blind transmissions for the control channels and for the data channels to realize a target block error rate performance (BLER) for the channel of interest. In addition, for the data channels the use of blind transmissions assuming MCS-1 (i.e., the lowest modulation and coding scheme (MCS) supported in EGPRS today) is combined with HARQ retransmissions to realize the needed level of data transmission performance. Support for extended coverage is realized by defining different coverage classes. A different number of blind transmissions are associated with each of the coverage classes wherein extended coverage is associated with coverage classes for which multiple blind transmissions are needed (i.e., a single blind transmission is considered as the reference coverage). The number of total blind transmissions for a given coverage class can differ between different logical channels.

At the 3rd-Generation Partnership Project (3GPP) Technical Specification Group (TSG) Radio Access Network (RAN) Meeting #72, a Work Item on "Positioning Enhancements for GERAN" was approved (see RP-161260; Busan, Korea; 13-16 Jun. 2016—the contents of which are hereby incorporated herein by reference for all purposes), wherein one candidate method for realizing improved accuracy when determining the position of a mobile station (MS) is multilateration timing advance (MTA) (see RP-161034; Busan, Korea; 13-16 Jun. 2016—the contents of which are hereby incorporated herein by reference for all purposes), which relies on establishing the MS position based on Timing Advance (TA) values in multiple cells.

At the 3GPP TSG-RAN1 Meeting #86, a proposal based on a similar approach was made also to support positioning of Narrow Band Internet of Things (NB-IoT) mobiles (see R1-167426; entitled "On timing advance based multi-leg positioning for NB-IoT;" Source: Ericsson LM; Gothenburg, Sweden; 22-26 Aug. 2016—the contents of which are hereby incorporated herein by reference for all purposes). In regards to IoT devices, it expected that in a near future, the population of Cellular IoT devices will be very large. Various predictions exist; one such prediction is that there will be >60000 cellular IoT devices per square kilometer (see draft Change Request (CR) 43.059 entitled "Introduction of Multilateration", Source Ericsson LM, RAN WG6 telco #1 on ePOS_GERAN, dated: Dec. 15, 2016—the contents of which are hereby incorporated herein by reference for all purposes), and another prediction is that there will be 1000000 cellular IoT devices per square kilometer (see R1-167426; entitled "On timing advance based multi-leg positioning for NB-IoT;" Source: Ericsson LM; Gothenburg, Sweden; 22-26 Aug. 2016—the contents of which are hereby incorporated herein by reference for all purposes). A large fraction of these cellular IoT devices are expected to be stationary, e.g., gas and electricity meters, vending machines, etc. . . . . Extended Coverage GSM-IoT (EC-GSM-IoT) and NB-IoT are two standards for Cellular IoT that have been specified by 3GPP TSG GERAN and TSG Radio Access Network (RAN).

Timing Advance (TA) is a measure of the propagation delay between a base transceiver station (BTS) and the MS, and since the speed by which radio waves travel is known, the distance between the BTS and the MS can be derived. Further, if the TA applicable to the MS is measured within multiple BTSs and the positions (i.e., longitude and latitude) of these BTSs are known, the position of the MS can be derived using the measured TA values. The measurement of the TA requires that the MS synchronize to each neighbor BTS and transmit a signal time-aligned with the timing of the BTS estimated by the MS. The BTS measures the time difference between its own time reference, and the timing of the received signal (transmitted by the MS). This time difference is equal to two times the propagation delay between the BTS and the MS (one propagation delay of the BTS's synchronization signal sent to the MS, plus one equal propagation delay of the signal transmitted by the MS back to the BTS).

As shown in FIG. 1 (PRIOR ART), once a set of TA values $TA_1$, $TA_2$, and $TA_3$ are established using a set of one or more BTSs $102_1$, $102_2$, $102_3$ (only three shown) during a given positioning procedure, the position of the MS 104 can be derived through a so called Multilateration Timing Advance (MTA) procedure wherein the position of the MS 104 is determined by the intersection of a set of hyperbolic curves $106_1$, $106_2$, $106_3$ associated with each BTS $102_1$, $102_2$, $102_3$. The calculation of the position of the MS 104 is typically carried out by a serving positioning node 110 (e.g., serving Serving Mobile Location Center 110 (SMLC 110)), which implies that all of the derived TA values $TA_1$, $TA_2$, and $TA_3$ and the associated position information of the BTSs $102_1$, $102_2$, $102_3$ needs to be sent to the serving positioning node 110 (i.e., the serving SMLC 110) which initiated the positioning procedure. In this example, the BTSs $102_1$, $102_2$, $102_3$ transmit their respective $TA_1$, $TA_2$, and $TA_3$ to one BSS 108 which then transmits $TA_1$, $TA_2$, and $TA_3$ to the SMLC 110. The BSS 108 and SMLC 110 are both connected to a SGSN 112. It should be appreciated that each BTS $102_1$, $102_2$, $102_3$ could also be connected to different BSSs (not shown) where in any configuration the SMLC 110 is still provided with the calculated $TA_1$, $TA_2$, and $TA_3$.

At the 3GPP TSG-RANG Meeting #2 as well as at the first RANG teleconference on Positioning enhancements for GSM/EDGE Radio Access Network (GERAN), several draft Change Requests (CRs) to 3GPP TS 43.059 V13.2.0, dated Jun. 1, 2016 describing the Multilateration Timing Advance procedure were reviewed and discussed. For example, FIG. 2 (PRIOR ART) which illustrates the Multilateration Timing Advance procedure in the Packet Switched (PS) domain was discussed at this meeting and during the teleconference. In particular, FIG. 2 (PRIOR ART) was presented in the following CRs: (1) R6-160274, entitled "CR 43.059-0081 rev 3 Introduction of Multilateration," Source: Ericsson LM, Reno, Nev., U.S.A., 14-18 Nov. 2016 (http://www.3gpp.org/ftp/tsg_ran/WG6_legacyRAN/ TSGR6_02/Docs/R6-160274.zip); and (2) the draft CR 43.059 entitled "Introduction of Multilateration", Source Ericsson LM, RAN WG6 telco #1 on ePOS_GERAN, dated: Dec. 15, 2016) (note: the contents of these documents are hereby incorporated herein by reference for all purposes). In the FIG. 2A's step 4, the sending of the Radio Resource Location services Protocol (RRLP) Multilateration Timing Advance Request message from the SMLC 110 to the MS 104 is tunneled via the BSS 108 and the SGSN 112, where this tunneling means that the type of positioning procedure to be used by the MS 104 which is being requested to perform the MTA procedure is transparent to the SGSN 112 (i.e., the SGSN 112 is aware that the MS 104 is being requested to perform a positioning procedure but not the specific MTA procedure). This transparent tunneling and the resulting lack of knowledge on the part of the SGSN 112 that the MS 104 is being requested to perform a MTA procedure leads to problems. A more detailed discussion about this transparent tunneling between the BSS 108 and the SGSN 112 and the problems associated with this transparent tunneling are described in more detail next.

FIG. 2A's step 4 comprises the following signaling: (1) the SMLC 110 transmits a BSSMAP Connection Oriented Message 202 (which includes a RRLP APDU 204 which includes a RRLP Multilateration Timing Advance (MTA) Request message 206 intended for the target MS 104) to the BSS 108 (see FIG. 2B's step 4a); (2) the BSS 108 transmits a BSS GPRS Protocol (BSSGP) POSITION-COMMAND PDU 208 (which includes the RRLP APDU 204 which includes the RRLP MTA Request message 206) to the SGSN 112 (see FIG. 2B's step 4b); (3) the SGSN 112 transmits a BSSGP Downlink (DL) UNITDATA PDU 210 which includes a LLC PDU 212 (which includes the RRLP APDU 204 which further includes the RRLP MTA Request message 206) to the BSS 108 (see FIG. 2B's step 4c); (4) the BSS 108 transmits the LLC PDU 212 (which includes the RRLP APDU 204 which further includes the RRLP MTA Request message 206) to the MS 104 (see FIG. 2B's step 4d); and (5) the MS 104 transmits a PACCH acknowledgment 214 to the BSS 108 (see FIG. 2B's step 4e). FIG. 3 (PRIOR ART) is a diagram that illustrates the content of the BSSGP POSITION-COMMAND PDU 208 per the standard 3GPP TS 48.018's TABLE 10.5.4 V14.1.0, dated Dec. 23, 2016—the contents of which are hereby incorporated herein by reference for all purposes. The BSSGP POSITION-COMMAND PDU 208 (which includes the RRLP APDU 204 which in this disclosure further includes the RRLP MTA Request message 206) allows the BSS 108 to request the SGSN 112 to perform the position command procedure (note: as discussed above the SGSN 112 is aware that the MS 104 is being requested to perform a position command procedure but does not know that the position command procedure is a MTA procedure). FIG. 4 (PRIOR ART) is a diagram that illustrates the content of the RRLP APDU 204 per the standard 3GPP TS 48.018's TABLE 11.3.49 V14.1.0, dated Dec. 23, 2016. The RRLP APDU 204 conveys an embedded message associated with a higher level protocol where in this case the embedded message is the RRLP MTA Request message 206. FIG. 5 (PRIOR ART) is a diagram that illustrates the content of RRLP Flags Information Element (IE) 500 (see also FIG. 3) per the standard 3GPP TS 48.018's TABLE 11.3.60 V_14.1.0, dated Dec. 23, 2016. The RRLP Flags IE 500 provides the control information for the RRLP APDU 204 where the fields are coded as follows: Flag 1 (Octet 3, bit 1) wherein bit value "0" indicates a position command (BSS 108 to SGSN 112) or final response (SGSN 112 to BSS 108); bit value "1" indicates that this is not a position command or final response; and spare where these bits are ignored by the receiver and set to zero by the sender.

The transparent tunneling of the RRLP MTA Request message 206 through the SGSN 112 entails where the SGSN 112 upon receiving the BSSGP POSITION-COMMAND PDU 208 is informed that the BSS 108 is requesting the SGSN 112 to perform a positioning procedure but the SGSN 112 does not know that the specific positioning procedure is a Multilateration Timing Advance (MTA) procedure. The SGSN 112 does not know that the positioning procedure is a Multilateration Timing Advance (MTA) procedure because the SGSN 112 does not read the RRLP APDU 204 which includes the RRLP MTA Request message 206 but instead the SGSN 112 just inserts the RRLP APDU 204 which includes the RRLP MTA Request message 206 within the LLC PDU 212 which is included in the BSSGP Downlink (DL) UNITDATA PDU 210 that the SGSN 112 then transmits to the BSS 108. The transparent tunneling of the RRLP MTA Request message 206 through the SGSN 112 leads to several problems when the target MS 104 has been requested unknowingly to the SGSN 112 to perform a Multilateration Timing Advance (MTA) procedure. These problems are as follows:

Problem 1: While a ready timer 420 is running in the SGSN 112 for a given MS 104, the SGSN 112 is not aware if the SMLC 110 has triggered (per FIG. 2B's step 4a) the MS 104 to perform the Multilateration Timing Advance procedure or not (note: in regards to the ready timer 420, it should be appreciated that if the MS 104 is in idle mode, then FIG. 2A's step 1 is preceded by the SGSN 112 sending a paging message to the MS 104, and when the SGSN 112 receives a paging response message from the MS 104, the SGSN 112 will start the ready timer 420 for the MS 104). This is a problem because if the MS 104 is performing the Multilateration Timing Advance procedure and this ready timer 420 is running, then the MS 104 is not reachable in the cell where the MS 104 last sent an uplink LLC PDU (e.g., the paging response message which started the ready timer 420) and the SGSN 112 that receives downlink data for the MS 104 will attempt unsuccessfully to deliver that downlink data to the MS 104. The MS 104 will not be available to receive the downlink data from the SGSN 112 during the Multilateration Timing Advance (MTA) procedure because the MS 104 per the MTA procedure has to successively connect to multiple neighboring cells for the purpose of allowing the BTS managing each of these cells to estimate the corresponding timing advance value (i.e., the MS 104 will be going from cell to cell while performing the MTA procedure and will therefore not be reachable on the control channel of the specific cell that the SGSN 112 associates with the MS 104 for which the ready timer 420 is running).

Problem 2: While the ready timer 420 is not running for a given MS 104, the SGSN 112 is not aware if the MS 104 is still performing a previously triggered Multilateration Timing Advance procedure. This is a problem because if the MS 104 is currently performing the previously triggered MTA procedure and the ready timer 420 is not running, then this means that the MS 104 is not reachable in its current paging area and that the paging procedure should therefore not be triggered by the SGSN 112. That is, if the SGSN 112 does trigger the paging procedure while the MS 104 is currently performing the previously triggered MTA procedure then the associated paging message will not be received by the MS 104 because the MS 104 is not listening for pages while performing the MTA procedure (i.e., the MS 104 will be going from cell to cell while performing the MTA procedure and will therefore not be reachable on the control channels of the cells comprising the paging area that the SGSN 112 associates with the MS 104 for which the ready timer 420 is not running).

In view of the foregoing, it can be appreciated that there is a need to address the aforementioned problems associated with the transparent tunneling between the BSS 108 and the SGSN 112 when the target MS 104 is being requested to perform a Multilateration Timing Advance (MTA) procedure. These needs and other needs are addressed by the present disclosure.

SUMMARY

A SGSN, a BSS, and various methods for addressing the aforementioned problems are described in the independent claims. Advantageous embodiments of the SGSN, the BSS, and the various methods are further described in the dependent claims.

In one aspect, the present disclosure provides a SGSN configured to interact with a BSS. The SGSN comprises a processor and a memory that stores processor-executable instructions, wherein the processor interfaces with the memory to execute the processor-executable instructions, whereby the SGSN is operable to perform a receive operation. In the receive operation, the SGSN receives from the BSS, a BSSGP POSITION-COMMAND PDU comprising (i) a RRLP APDU with an embedded RRLP MTA Request message for a target wireless device, and (ii) an indicator that the target wireless device is to perform a MTA procedure. An advantage of the SGSN implementing the receive operation is that when the SGSN receives an indicator that the target wireless device is to perform a MTA procedure then the SGSN can suspend downlink data delivery and paging to the target wireless device while the target wireless device is performing the MTA procedure.

In another aspect, the present disclosure provides a method in a SGSN configured to interact with a BSS. The method comprises a receiving step. In the receiving step, the SGSN receives from the BSS, a BSSGP POSITION-COMMAND PDU comprising (i) a RRLP APDU with an embedded RRLP MTA Request message for a target wireless device, and (ii) an indicator that the target wireless device is to perform a MTA procedure. An advantage of the SGSN implementing the receiving step is that when the SGSN receives an indicator that the target wireless device is to perform a MTA procedure then the SGSN can suspend downlink data delivery and paging to the target wireless device while the target wireless device is performing the MTA procedure.

In yet another aspect, the present disclosure provides a BSS configured to interact with a SGSN. The BSS further comprises a processor and a memory that stores processor-executable instructions, wherein the processor interfaces with the memory to execute the processor-executable instructions, whereby the BSS is operable to perform a first transmit operation. In the transmit operation, the BSS transmits, to the SGSN, a BSSGP POSITION-COMMAND PDU comprising (i) a RRLP APDU with an embedded RRLP MTA Request message for a target wireless device, and (ii) an indicator that the target wireless device is to perform a MTA procedure. An advantage of the BSS implementing the transmit operation is that when the SGSN receives an indicator that the target wireless device is to perform a MTA procedure then the SGSN can suspend downlink data delivery and paging to the target wireless device while the target wireless device is performing the MTA procedure.

In still yet another aspect, the present disclosure provides a method in a BSS configured to interact with a SGSN. The method comprises a transmitting step. In the transmitting step, the BSS transmits, to the SGSN, a BSSGP POSITION-COMMAND PDU comprising (i) a RRLP APDU with an embedded RRLP MTA Request message for a target wireless device, and (ii) an indicator that the target wireless device is to perform a MTA procedure. An advantage of the BSS implementing the transmitting step is that when the SGSN receives an indicator that the target wireless device is to perform a MTA procedure then the SGSN can suspend downlink data delivery and paging to the target wireless device while the target wireless device is performing the MTA procedure.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings:

FIG. 3 (PRIOR ART) is a diagram that illustrates the content of a BSSGP POSITION-COMMAND PDU which the BSS transmits to the SGSN when requesting the SGSN to perform a position command procedure per the standard 3GPP TS 48.018 V14.1.0, dated Dec. 23, 2016;

FIG. 4 (PRIOR ART) is a diagram that illustrates the content of a RRLP APDU IE which is included in the BSSGP POSITION-COMMAND PDU per the standard 3GPP TS 48.018 V14.1.0, dated Dec. 23, 2016;

FIG. 5 (PRIOR ART) is a diagram that illustrates the content of a RRLP Flags IE which is included in the BSSGP POSITION-COMMAND PDU per the standard 3GPP TS 48.018 V14.1.0, dated Dec. 23, 2016;

FIG. 7 is a diagram that illustrates the content of a BSSGP POSITION-COMMAND PDU modified to include a Multilateration Timer IE in accordance with an embodiment of the present disclosure;

FIG. 8 is a diagram that illustrates the content of the Multilateration Timer IE which includes a MPM timer value in accordance with an embodiment of the present disclosure;

FIGS. 10A and 10B1-10B3 are an illustration of a Multilateration Positioning procedure similar to the one shown in FIGS. 2A-2B (PRIOR ART) but has been modified to highlight three different techniques (embodiments) in accordance with the present disclosure;

DETAILED DESCRIPTION

Figure 6:
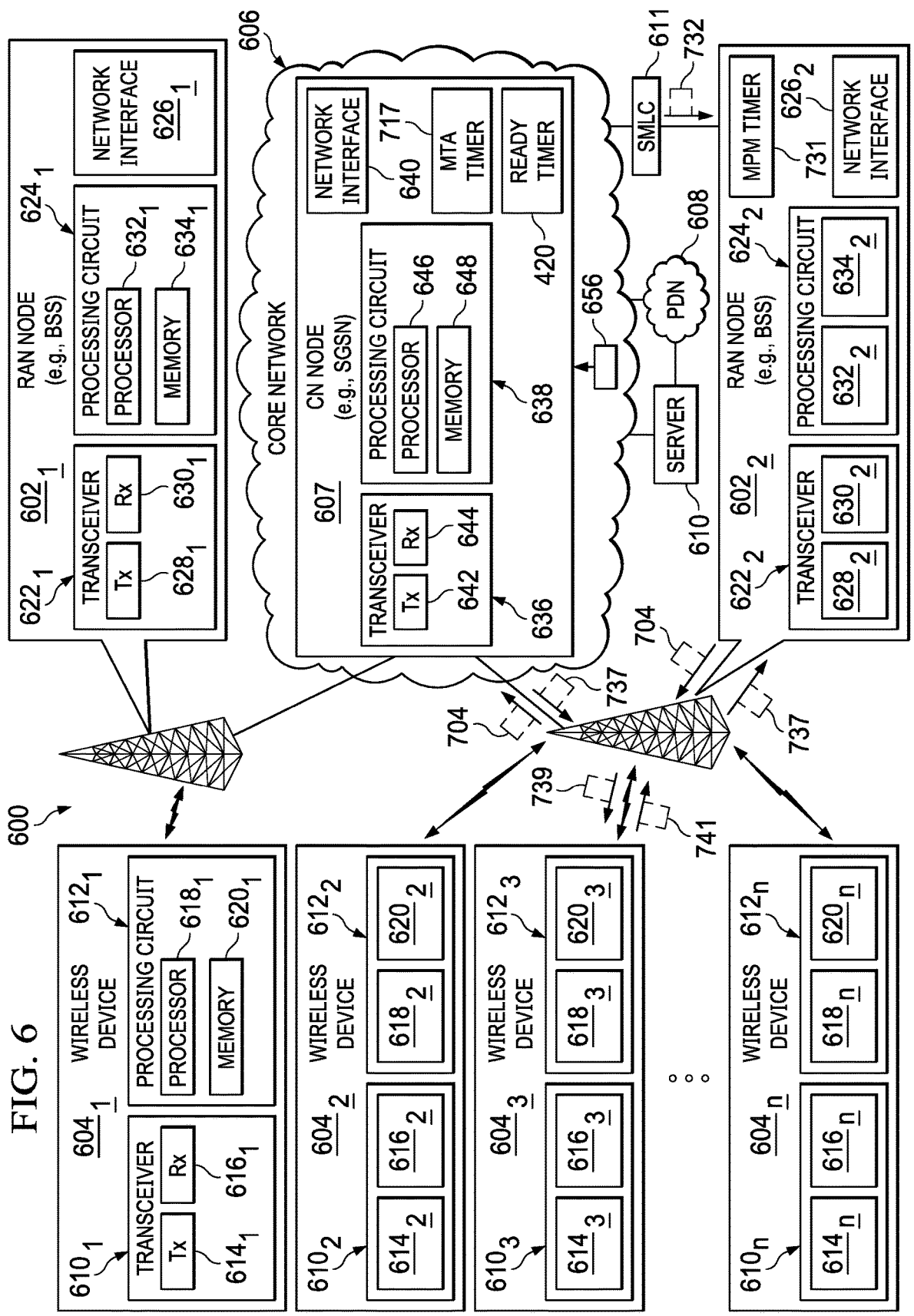
FIG. 6 is a diagram of an exemplary wireless communication network which includes a SGSN, multiple BSSs, and multiple wireless devices which are configured in accordance with an embodiment of the present disclosure.

A discussion is provided first herein to describe an exemplary wireless communication network that includes a CN node (e.g., SGSN, MME), multiple RAN nodes (e.g., BSSs, NodeBs, eNodeBs), and multiple wireless devices (e.g., mobile stations, IoT devices) in accordance with an embodiment of the present disclosure (see FIG. 6). Then, a discussion is provided to disclose various techniques that the CN node (e.g., SGSN, MME), and the RAN node (e.g., BSS, NodeB, eNodeB) can implement such that the CN node (e.g., SGSN, MME) will be aware of when a target wireless device has been requested to perform a MTA procedure and as such can suspend downlink data delivery and paging to the target wireless device while the target wireless device is performing the MTA procedure (see FIGS. 7-10B3). Thereafter, a discussion is provided to explain the basic functionalities-configurations of the CN node (e.g., SGSN, MME), and the RAN node (e.g., BSS, NodeB, eNodeB) in accordance with different embodiments of the present disclosure (see FIGS. 11-14).

Exemplary Wireless Communication Network 600

Referring to FIG. 6, there is illustrated an exemplary wireless communication network 600 in accordance with the present disclosure. The wireless communication network 600 includes a core network 606 (which comprises at least one CN node 607) and multiple RAN nodes $602_1$ and $602_2$ (only two shown) which interface with multiple wireless devices $604_1$, $604_2$, $604_3$ ... $604_n$. The wireless communication network 600 also includes many well-known components, but for clarity, only the components needed to describe the features of the present disclosure are described herein. Further, the wireless communication network 600 is described herein as being a GSM/EGPRS wireless communication network 600 which is also known as an EDGE wireless communication network 600. However, those skilled in the art will readily appreciate that the techniques of the present disclosure which are applied to the GSM/EGPRS wireless communication network 600 are generally applicable to other types of wireless communication systems, including, for example, WCDMA, LTE, and WiMAX systems.

The wireless communication network 600 includes the RAN nodes $602_1$ and $602_2$ (wireless access nodes—only two shown) which provide network access to the wireless devices $604_1$, $604_2$, $604_3$ ... $604_n$. In this example, the RAN node $602_1$ is providing network access to wireless device $604_1$ while the RAN node $602_2$ is providing network access to wireless devices $604_2$, $604_3$ ... $604_n$. The RAN nodes $602_1$ and $602_2$ are connected to the core network 606 (e.g., SGSN core network 606) and, in particular, to the CN node 607 (e.g., SGSN 607). The core network 606 is connected to an external packet data network (PDN) 608, such as the Internet, and a server 610 (only one shown). The wireless devices $604_1$, $604_2$, $604_3$ ... $604_n$ may communicate with one or more servers 609 (only one shown) connected to the core network 606 and/or the PDN 608. In this example, the RAN node $602_2$ and the CN node 607 are both connected to a positioning server 611 (e.g., Serving Mobile Location Center 611). The other RAN node $602_2$ can be connected to the same positioning server 611 (e.g., Serving Mobile Location Center 611) or to a different positioning server 611 (e.g., Serving Mobile Location Center 611).

The wireless devices $604_1$, $604_2$, $604_3$ ... $604_n$ may refer generally to an end terminal (user) that attaches to the wireless communication network 600, and may refer to either a MTC device (e.g., a smart meter) or a non-MTC device. Further, the term "wireless device" is generally intended to be synonymous with the term mobile device, mobile station (MS), "User Equipment," or UE, as that term is used by 3GPP, and includes standalone wireless devices, such as terminals, cell phones, smart phones, tablets, cellular IoT devices, IoT devices, and wireless-equipped personal digital assistants, as well as wireless cards or modules that are designed for attachment to or insertion into another electronic device, such as a personal computer, electrical meter, etc.

Likewise, unless the context clearly indicates otherwise, the term RAN node $602_1$ and $602_2$ (wireless access node $602_1$ and $602_2$) is used herein in the most general sense to refer to a base station subsystem (BSS), a wireless access node, or a wireless access point in a wireless communication network 600, and may refer to RAN nodes $602_1$ and $602_2$ that are controlled by a physically distinct radio network controller as well as to more autonomous access points, such as the so-called evolved Node Bs (eNodeBs) in Long-Term Evolution (LTE) networks.

Each wireless device $604_1$, $604_2$, $604_3$ ... $604_n$ may include a transceiver circuit $610_1$, $610_2$, $610_3$ ... $610_n$ for communicating with the RAN nodes $602_1$ and $602_2$, and a processing circuit $612_1$, $612_2$, $612_3$ ... $612_n$ for processing signals transmitted from and received by the transceiver circuit $610_1$, $610_2$, $610_3$ ... $610_n$ and for controlling the operation of the corresponding wireless device $604_1$, $604_2$, $604_3$ ... $604_n$. The transceiver circuit $610_1$, $610_2$, $610_3$ ... $610_n$ may include a transmitter $614_1$, $614_2$, $614_3$ ... $614_n$ and a receiver $616_1$, $616_2$, $616_3$ ... $616_n$, which may operate according to any standard, e.g., the GSM/EDGE standard. The processing circuit $612_1$, $612_2$, $612_3$ ... $612_n$ may include a processor $618_1$, $618_2$, $618_3$ ... $618_n$ and a memory $620_1$, $620_2$, $620_3$ ... $620_n$ for storing program code for controlling the operation of the corresponding wireless device $604_1$, $604_2$, $604_3$ ... $604_n$. The program code may include code for performing the procedures as described hereinafter.

Each RAN node $602_1$ and $602_2$ (BSS $602_1$ and $602_2$) may include a transceiver circuit $622_1$ and $622_2$ for communicating with wireless devices $604_1$, $604_2$, $604_3$ ... $604_n$, a processing circuit $624_1$ and $624_2$ for processing signals transmitted from and received by the transceiver circuit $622_1$ and $622_2$ and for controlling the operation of the corresponding RAN node $602_1$ and $602_2$, and a network interface $626_1$ and $626_2$ for communicating with the core network 606. The transceiver circuit $622_1$ and $622_2$ may include a transmitter $628_1$ and $628_2$ and a receiver $630_1$ and $630_2$, which may operate according to any standard, e.g., the GSM/EDGE standard. The processing circuit $624_1$ and $624_2$ may include a processor $632_1$ and $632_2$, and a memory $634_1$ and $634_2$ for storing program code for controlling the operation of the corresponding RAN node $602_1$ and $602_2$. The program code may include code for performing the procedures as described hereinafter.

The CN node 607 (e.g., SGSN 607, MME 607) may include a transceiver circuit 636 for communicating with the RAN nodes $602_1$ and $602_2$, a processing circuit 638 for processing signals transmitted from and received by the transceiver circuit 636 and for controlling the operation of the CN node 607, and a network interface 640 for communicating with the RAN nodes $602_1$ and $602_2$. The transceiver circuit 636 may include a transmitter 642 and a receiver 644, which may operate according to any standard, e.g., the GSM/EDGE standard. The processing circuit 638 may include a processor 646 and a memory 648 for storing program code for controlling the operation of the CN node 607. The program code may include code for performing the procedures as described hereinafter.

Techniques for Informing the SGSN 607 when a Wireless Device $604_3$ is Going to be Performing a MTA Procedure To address the prior art's aforementioned problems, various techniques are described hereinafter which ensure that the SGSN 607 is aware that the SMLC 611 has triggered a given wireless device $604_3$ (for example) to perform a Multilateration Timing Advance (MTA) procedure. For example, one technique described herein introduces a means for the BSS $602_2$ to indicate (e.g., via a single bit flag 707) to the SGSN 607 that the RRLP APDU 702 (i.e., the embedded RRLP APDU 702 carried within a POSITION-COMMAND PDU 704) that is being tunneled to a wireless device (e.g. wireless device $604_3$) via the SGSN 607 is in fact a RRLP Multilateration Timing Advance Request message 706 such that the SGSN 607 can start a timer 708 (e.g., MTA timer 717) where during the running of the timer 708 the SGSN 607 expects the wireless device $604_3$ to be unavailable due to performing the MTA procedure (first embodiment). Other techniques described herein introduce different means for the BSS $602_2$ to indicate (e.g., via a MTA specific timer value 709) to the SGSN 607 that the RRLP APDU 702 (i.e., the embedded RRLP message 702 carried within a POSITION-COMMAND PDU 704) that is being tunneled via the SGSN 607 is in fact a RRLP Multilateration Timing Advance Request message 706 where the indication (e.g., MTA specific timer value 709) indicates to the SGSN 607 a time period during which the wireless device $604_3$ is expected to be unavailable due to performing the MTA procedure (second and third embodiments).

The SGSN 607 by being made aware that the SMLC 611 has triggered the wireless device $604_3$ (for example) to perform a Multilateration Timing Advance procedure may then (a) suspend downlink data delivery to the wireless device $604_3$ while the Multilateration Timing Advance specific timer 708 is running and the Ready timer 420 is running (i.e., solve the aforementioned problem 1), and (b) not attempt to page the wireless device $604_3$ while the Multilateration Timing Advance specific timer 708 is running and the Ready timer 420 is not running (i.e., solve the aforementioned problem 2).

An objective of the various techniques (embodiments) of the present disclosure is for the BSS $602_2$ to provide the SGSN 607 with an indication, e.g., in the form of a flag 707 or a timer 709, that a given wireless device $604_3$ (for example) has been triggered to perform the Multilateration Timing Advance (MTA) procedure. The exemplary techniques (embodiments) are discussed in detail next.

In a first technique (first embodiment), to ensure that the SGSN 607 is aware that a RRLP Multilateration Timing Advance (MTA) Request message 706 is being sent to a given wireless device 604$_3$ (for example), the BSSGP POSITION-COMMAND PDU 704 sent by the BSS 602$_2$ to the SGSN 607 is enhanced with a new Multilateration Timer IE 720 that provides the SGSN 607 with an indication 707 that the SGSN 607 is to start a timer 717 (e.g., MTA timer 717). In its simplest form the Multilateration Timer IE 720 may have an indication 707 which is a single bit flag. In exemplary applications, the MTA timer 717 can be used by the SGSN 607 to (a) suspend downlink data delivery to the wireless device 604$_3$ (i.e., solve the aforementioned problem 1), (b) guard against the SGSN 607 being asked to start another MTA positioning procedure with the wireless device 604$_3$ (for example) while the wireless device 604$_3$ already has an ongoing MTA positioning procedure (i.e., solve the aforementioned problem 2), and (c) allow the SGSN 607 to know the maximum time that it should allow for the MTA positioning procedure to be completed by the wireless device 604$_3$.

Figure 1:
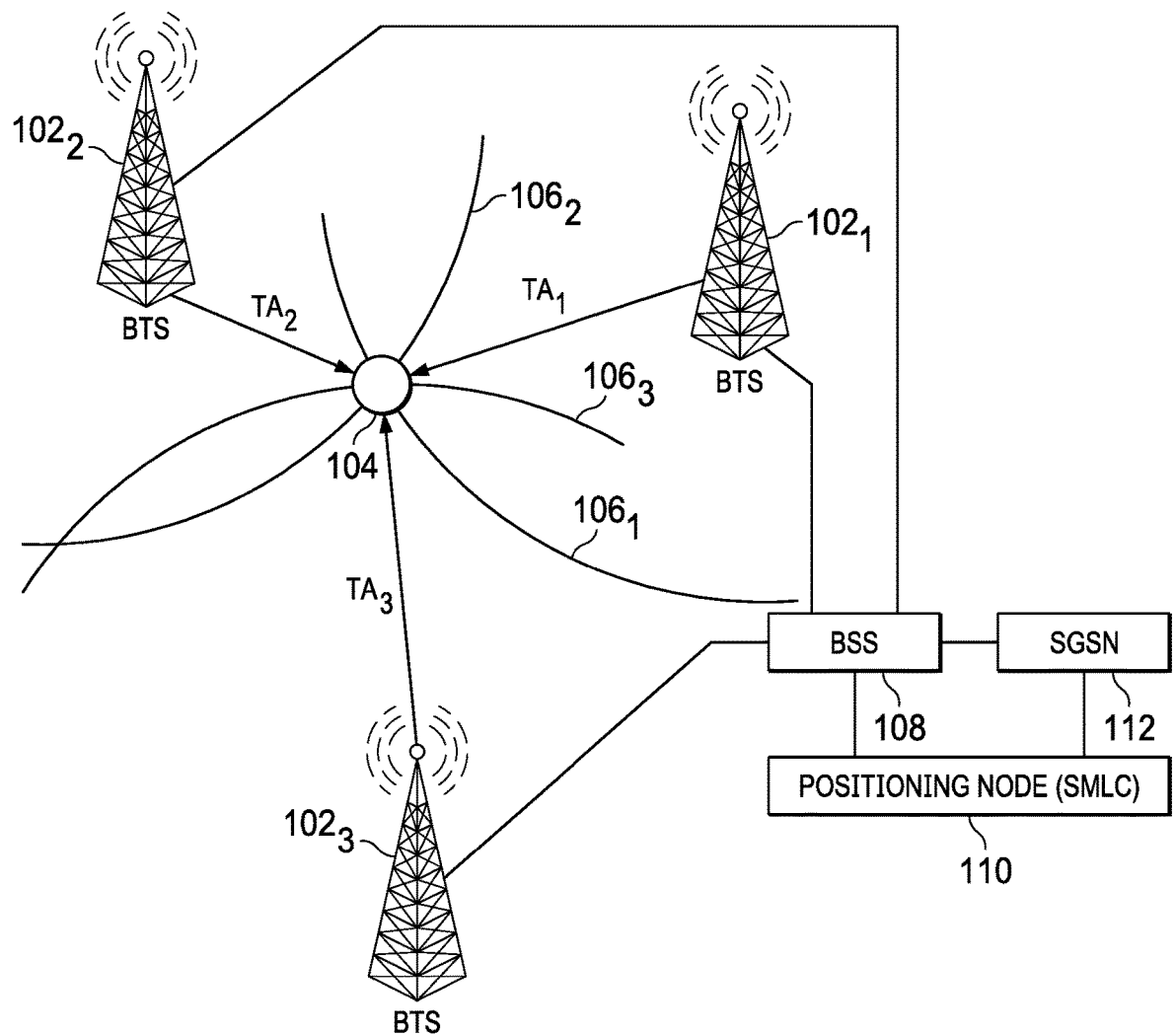
FIG. 1 (PRIOR ART) is a diagram illustrating a Multilateration positioning process involving three base transceiver stations associated with three timing advance (TA) values for a particular wireless device.

In a second technique (second embodiment), to ensure that the SGSN 607 is aware that a RRLP Multilateration Timing Advance (MTA) Request message 706 is being sent to a given wireless device 604$_3$ (for example), the BSSGP POSITION-COMMAND PDU 704 sent by the BSS 602$_2$ to the SGSN 607 is enhanced with a new Multilateration Timer IE 720 that provides the SGSN 607 with a timer value 709 (e.g., MPM timer value 709) which is used to set the MTA timer 717. In exemplary applications, the MTA timer 717 can be used by the SGSN 607 to (a) suspend downlink data delivery to the wireless device 604$_3$ (i.e., solve the aforementioned problem 1), (b) guard against the SGSN 607 being asked to start another MTA positioning procedure with the wireless device 604$_3$ (for example) while the wireless device 604$_3$ already has an ongoing MTA positioning procedure (i.e., solve the aforementioned problem 2), and (c) allow the SGSN 607 to know the maximum time that it should allow for the MTA positioning procedure to be completed by the wireless device 604$_3$. The timer value 709 which is provided in the Multilateration Timer IE 720 to the SGSN 607 is the same timer value which is associated with a Multilateration Positioning Method (MPM) timer 730 that the SMLC 611 transmits in the BSSMAP-LE CONNECTION ORIENTED INFORMATION message 732 (see FIG. 10B1) to the serving BSS 602$_2$ (for example) for the purpose of knowing how long the Signalling Connection Control Part (SCCP) connection across the Lb interface shall be maintained (note: the Lb interface is between SMLC 611 and BSS 602$_2$). It should be appreciated that the SMLC 611 is the master in that it determines what positioning procedure (e.g., the MTA procedure) is to be used and how long the positioning procedure (e.g., the MTA procedure) should take to perform. The SMLC 611 transmits the value of the MPM timer 730 in the BSSMAP-LE CONNECTION ORIENTED INFORMATION message 732 to the BSS 602$_2$ (for example) to instruct the BSS 602$_2$ to drop the positioning procedure specific data link when a corresponding MPM timer 731 in the BSS 602$_2$ set to the timer value (provided by the SMLC 611) expires since the SMLC 611 will not be accepting any new positioning results from the BSS 602$_2$ once the MPM timer 730 has expired. FIG. 7 is a diagram that illustrates the content of the BSSGP POSITION-COMMAND PDU 708 modified to include the Multilateration Timer IE 720. FIG. 8 is a diagram that illustrates the content of the Multilateration Timer IE 720 which includes the MPM timer value 709.

Figure 9:
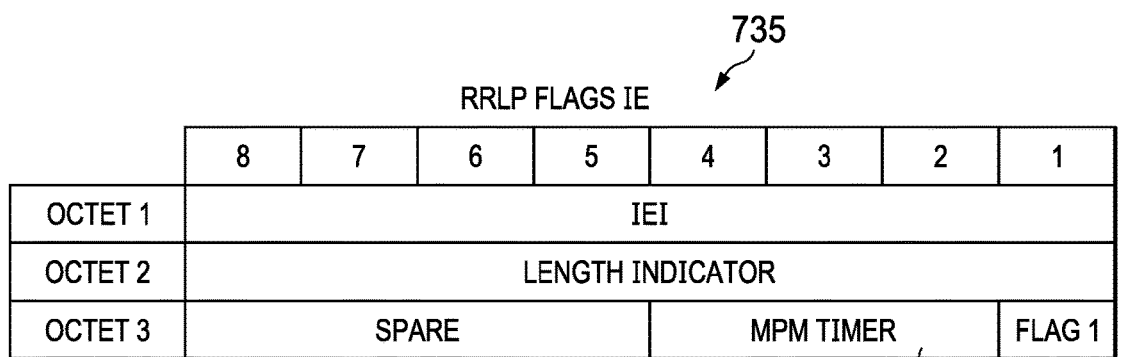
FIG. 9 is a diagram that illustrates the content of a modified RRLP Flags IE which includes a MPM timer value in accordance with an embodiment of the present disclosure.

In a third technique (third embodiment), to ensure that the SGSN 607 is aware that a RRLP Multilateration Timing Advance (MTA) Request message 706 is being sent to a given wireless device 604$_3$ (for example), the BSSGP POSITION-COMMAND PDU 704 sent by the BSS 602$_2$ to the SGSN 607 is enhanced where a RRLP Flags IE 735 is modified to include a timer value 709 which is used to set the MTA timer 717. The timer value 709 which is provided in the RRLP Flags IE 735 to the SGSN 607 is the same timer value 709 which is associated with a Multilateration Positioning Method (MPM) timer 730 that the SMLC 611 provides in the BSSMAP-LE CONNECTION ORIENTED INFORMATION message 732 to the serving BSS 602$_2$ (for example) (see FIGS. 7 and 10B1) (note: see FIGS. 3 and 5 for details about the prior art non-modified RRLP Flags IE 500). In the third technique, the RRLP Flags IE 735 is modified to include the same timer value 709 as the Multilateration Positioning Method (MPM) timer 730 which both the BSS 602$_2$ as well as the SGSN 607 can use during the MTA procedure for the given wireless device 604$_3$. The BSS 602$_2$ can use the timer value 709 indicated by the RRLP Flags IE 735 to supervise the SCCP connection associated with the wireless device 604$_3$ (for example). The SGSN 607 can use the timer value 709 indicated by the RRLP Flags IE 735 to suspend downlink data delivery and paging to the wireless device 604$_3$ for the duration of the MTA timer 717 which is set based on the timer value 709. It is possible to have the modified RRLP Flags IE 735 which includes the timer value 709 per the third technique because the non-modified RRLP Flags IE 500 is included per FIG. 2B (PRIOR ART) in a MS Position Command message (not shown but sent from the SMLC 110 to the BSS 108 see 3GPP TS 48.071 V13.0.0, dated Jan. 6, 2016—the contents of which are hereby incorporated herein by reference for all purposes), which in turn is included within the BSSLAP APDU IE (which is part of the BSSMAP-LE CONNECTION ORIENTED INFORMATION message 202 sent from the SMLC 110 to the BSS 108—see 3GPP TS 49.031 V13.0.0, dated Jan. 6, 2016—the contents of which are hereby incorporated herein by reference for all purposes) as well as in the BSSGP POSITION COMMAND PDU 208 (sent from the BSS 108 to the SGSN 112—see 3GPP TS 48.018 V14.1.0. dated Dec. 23, 2016—the contents of which are hereby incorporated herein by reference for all purposes). FIG. 9 is a diagram that illustrates the content of the modified RRLP Flags IE 735 (note: the modified RRLP Flags IE 735 which includes the MPM timer value 709 would be part of the BSSGP POSITION-COMMAND PDU 708 which is shown in detail in FIG. 7).

Figure 2A:
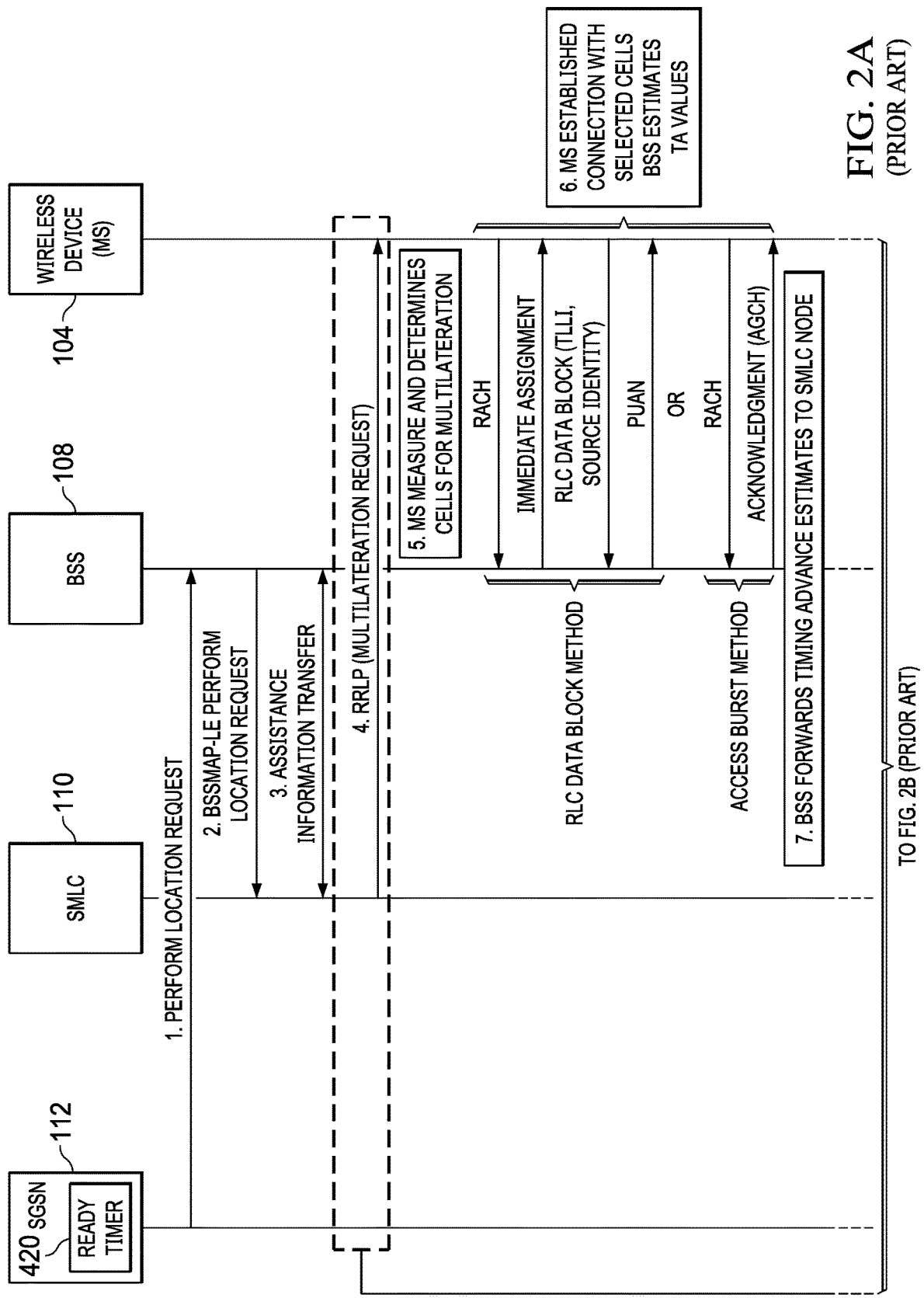
FIGS. 2A-2B (PRIOR ART) are a signal chart illustrating a Multilateration procedure for determining a position of a wireless device.
Figure 2B:
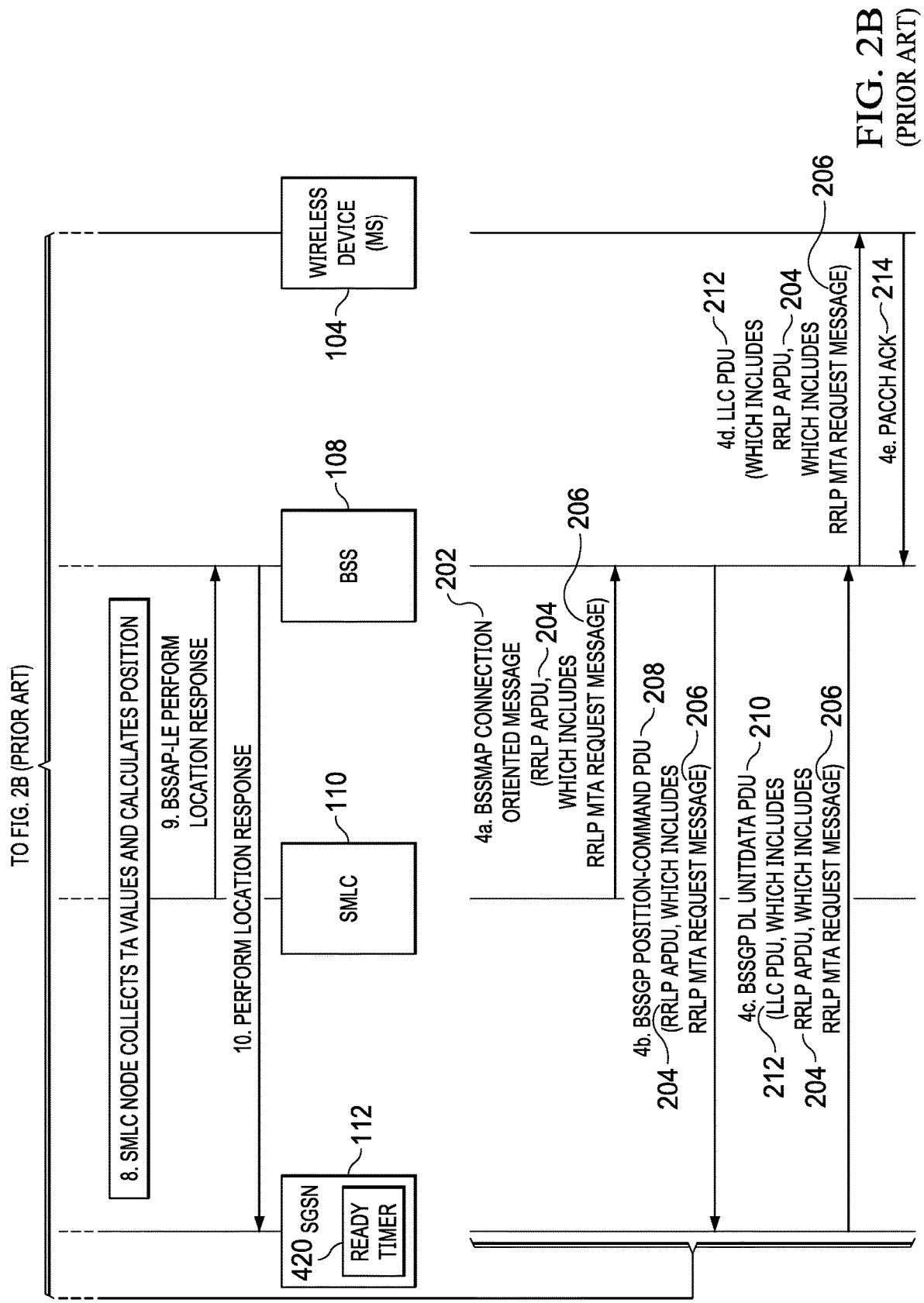
Figure 10A:
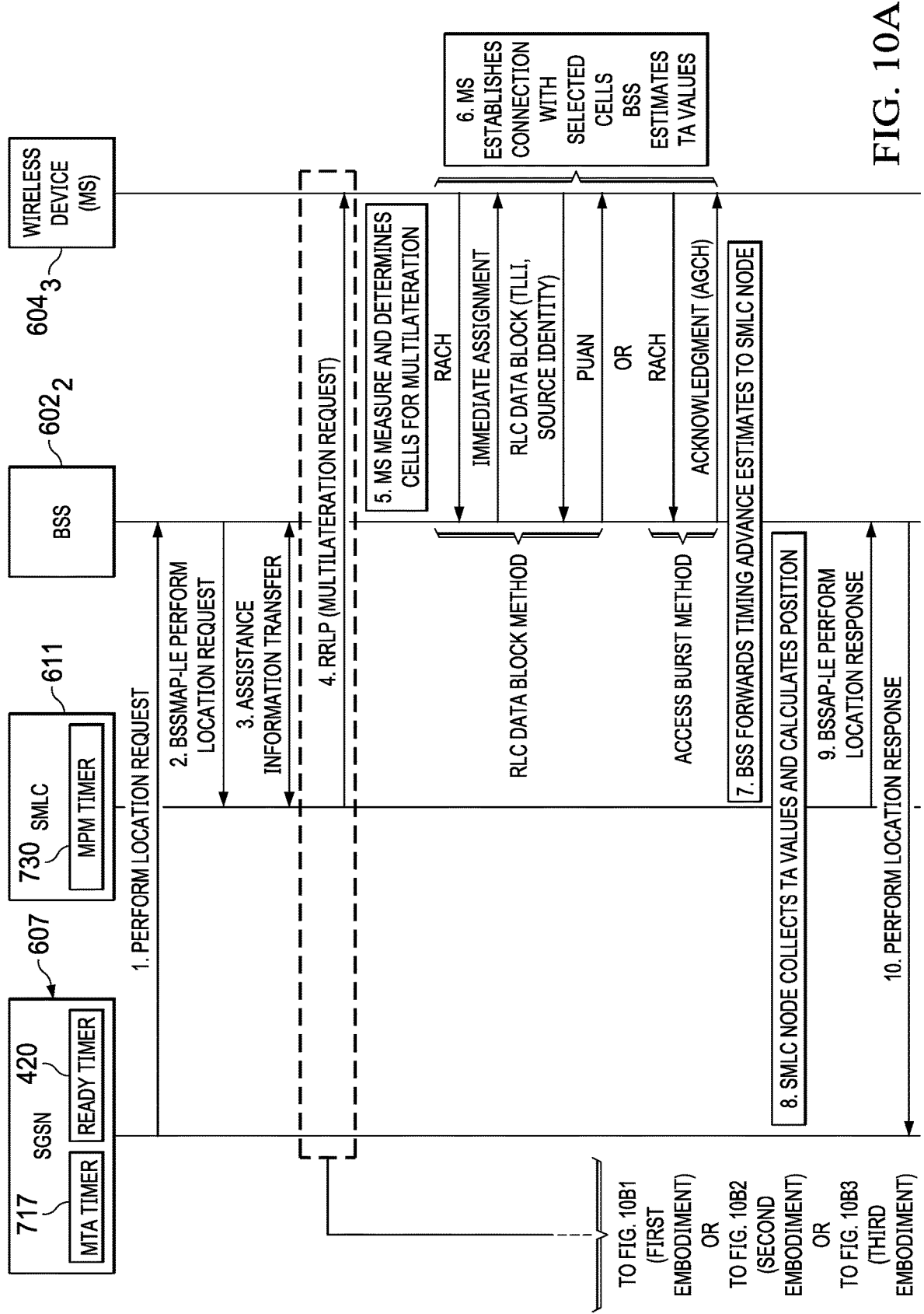

Referring to FIGS. 10A and 10B1-10B3, there is an illustration of a Multilateration Positioning procedure similar to the one shown in FIG. 2 (PRIOR ART) but which has been modified to highlight the three different techniques (embodiments) in accordance with the present disclosure. FIG. 10A's step 4 comprises the following signaling: (1) the SMLC 611 transmits a BSSMAP Connection Oriented Message 732 (which includes (i) MPM timer 730 (used for the second and third embodiments), and (ii) a RRLP APDU 702 (which includes a RRLP MTA Request message 706 intended for the target wireless device 604$_3$) to the BSS 602$_2$ (see FIG. 10B1-10B3's step 4a); (2) the BSS 602$_2$ transmits a BSSGP POSITION-COMMAND PDU 704 (which includes (i) the Multilateration Timer IE 720 which includes the indicator 707 (first embodiment) or the timer value 709 (second embodiment) or the modified RRLP Flags IE 735 which includes timer value 709 (third embodiment), and (ii) the RRLP APDU 702 which includes the RRLP MTA Request message 706) to the SGSN 607 (see FIG. 10B1-10B3's step 4b); (3) the SGSN 607 transmits a BSSGP DL UNITDATA PDU 737 which includes a LLC PDU 739 (which includes the RRLP APDU 702 which further includes the RRLP MTA Request message 706) to the BSS 602₂ (see FIG. 10B1-10B3's step 4c); (4) the BSS 602₂ transmits the LLC PDU 739 (which includes the RRLP APDU 702 which further includes the RRLP MTA Request message 706) to the MS 604₃ (see FIG. 10B1-10B3's step 4d); and (5) the MS 604₃ transmits a PACCH acknowledgment 741 to the BSS 602₂ (see FIG. 10B1-B3's step 4e). It should be appreciated that the aforementioned messages and PDUs 732, 704, 737, 739, and 741 may include more information than discussed above but only the information needed to describe the features of the present disclosure are described herein.

Basic Functionalities-Configurations of the SGSN 607 and the BSS 602₂ (for Example)

Figure 11:
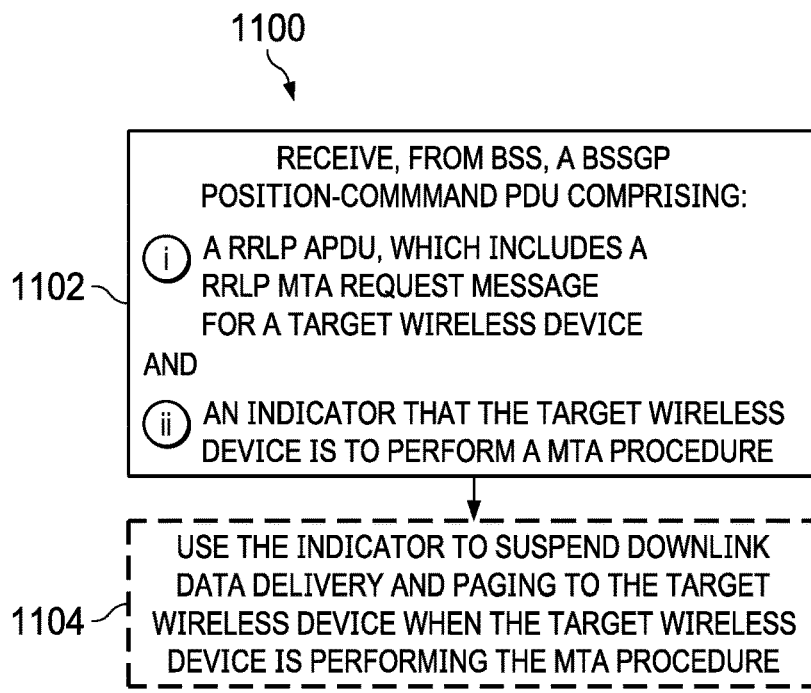
FIG. 11 is a flowchart of a method implemented in the SGSN in accordance with an embodiment of the present disclosure.

Referring to FIG. 11, there is a flowchart of a method 1100 implemented in the SGSN 607 which is configured to interact with BSS 602₂ in accordance with an embodiment of the present disclosure. At step 1102, the SGSN 607 receives, from the BSS 602₂, a BSSGP POSITION-COMMAND PDU) 704 comprising (i) a RRLP Application APDU 702 with an embedded RRLP MTA Request message 706 for a target wireless device 604₃, and (ii) an indicator 720, 735 that the target wireless device 604₃ is to perform a MTA procedure. At step 1104, the SGSN 607 uses the indicator 720, 735 to suspend downlink data delivery and paging to the target wireless device 604₃ when the target wireless device 604₃ is expected to be unavailable due to performing the MTA procedure.

Figure 12:
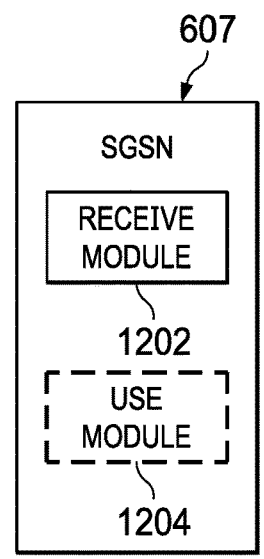
FIG. 12 is a block diagram illustrating a structure of the SGSN configured in accordance with an embodiment of the present disclosure.

Referring to FIG. 12, there is a block diagram illustrating structures of an exemplary SGSN 607 in accordance with an embodiment of the present disclosure. In one embodiment, the SGSN 607 comprises a receive module 1202, and a use module 1204. The receive module 1202 is configured to receive, from the BSS 602₂, a BSSGP POSITION-COMMAND PDU) 704 comprising (i) a RRLP Application APDU 702 with an embedded RRLP MTA Request message 706 for a target wireless device 604₃, and (ii) an indicator 720, 735 that the target wireless device 604₃ is to perform a MTA procedure. The use module 1204 is configured to use the indicator 720, 735 to suspend downlink data delivery and paging to the target wireless device 604₃ when the target wireless device 604₃ is expected to be unavailable due to performing the MTA procedure. It should be noted that the SGSN 607 may also include other components, modules or structures which are well-known, but for clarity, only the components, modules or structures needed to describe the features of the present disclosure are described herein.

As those skilled in the art will appreciate, the above-described modules 1202 and 1204 of the SGSN 607 may be implemented separately as suitable dedicated circuits. Further, the modules 1202 and 1204 can also be implemented using any number of dedicated circuits through functional combination or separation. In some embodiments, the modules 1202 and 1204 may be even combined in a single application specific integrated circuit (ASIC). As an alternative software-based implementation, the SGSN 607 may comprise a memory 648, a processor 646 (including but not limited to a microprocessor, a microcontroller or a Digital Signal Processor (DSP), etc.) and a transceiver 636. The memory 648 stores machine-readable program code executable by the processor 646 to cause the SGSN 607 to perform the steps of the above-described method 1100.

Figure 13:
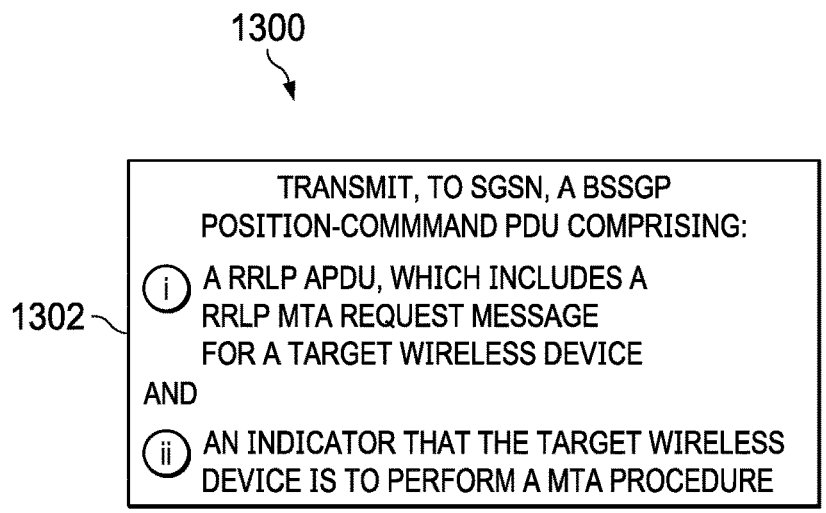
FIG. 13 is a flowchart of a method implemented in the BSS in accordance with an embodiment of the present disclosure.

Referring to FIG. 13, there is a flowchart of a method 1300 implemented in the BSS 602₂ (for example) that is configured to interact with the SGSN 607 in accordance with an embodiment of the present disclosure. At step 1302, the BSS 602₂ transmits, to the SGSN 607, a BSSGP POSITION-COMMAND PDU) 704 comprising (i) a RRLP Application APDU 702 with an embedded RRLP MTA Request message 706 for a target wireless device 604₃, and (ii) an indicator 720, 735 that the target wireless device 604₃ is to perform a MTA procedure. The SGSN 607 can use the indicator 720, 735 to suspend downlink data delivery and paging to the target wireless device 604₃ when the target wireless device 604₃ is expected to be unavailable due to performing the MTA procedure. It should be appreciated that the other BSS 602₁ could also be configured to perform method 1300.

Figure 14:
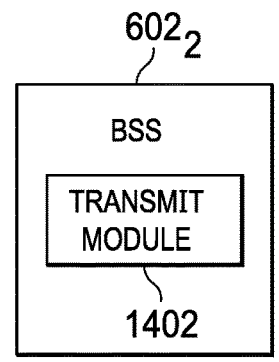
FIG. 14 is a block diagram illustrating a structure of the BSS configured in accordance with an embodiment of the present disclosure.

Referring to FIG. 14, there is a block diagram illustrating structures of an exemplary BSS 602₂ (for example) in accordance with an embodiment of the present disclosure. In one embodiment, the BSS 602₂ comprises a transmit module 1402. The transmit module 1402 is configured to transmit, to the SGSN 607, a BSSGP POSITION-COMMAND PDU) 704 comprising (i) a RRLP Application APDU 702 with an embedded RRLP MTA Request message 706 for a target wireless device 604₃, and (ii) an indicator 720, 735 that the target wireless device 604₃ is to perform a MTA procedure. It should be noted that the BSS 602₂ may also include other components, modules or structures which are well-known, but for clarity, only the components, modules or structures needed to describe the features of the present disclosure are described herein.

As those skilled in the art will appreciate, the above-described module 1402 may be implemented as a suitable dedicated circuit. Further, the module 1402 can also be implemented using any number of dedicated circuits through functional combination or separation. In some embodiments, the module 1402 may be in a single application specific integrated circuit (ASIC). As an alternative software-based implementation, the BSS 602₂ may comprise a memory 634₂, a processor 632₂ (including but not limited to a microprocessor, a microcontroller or a Digital Signal Processor (DSP), etc.) and a transceiver 622₂. The memory 634₂ stores machine-readable program code executable by the processor 632₂ to cause the BSS 602₂ to perform the step of the above-described method 1300.

In view of the foregoing, it will be appreciated by those skilled in the art that an objective of the present disclosure is to enable the BSS 602₂ to provide the SGSN 607 with an indication 720, 730 (e.g., in the form of a flag 707 or a timer 709), within the BSSGP POSITION-COMMAND PDU 704 that a target wireless device 604₃ (for example) has been triggered to perform a MTA procedure. An advantage of the present disclosure is that the SGSN 607 will be aware of when the target wireless device 604₃ is performing the MTA procedure and can as such suspend downlink data delivery and paging to the target wireless device 604₃ while the target wireless device 604₃ is performing the MTA procedure. Another advantage of the present disclosure is to provide the SGSN 607 with the information (i.e., that the wireless device 604₃ is being asked to perform a MTA procedure) so that the SGSN 607 can send a BSSGP DL UNITDATA PDU 737 to the BSS 602₂ that indicates advanced positioning procedures are to be used when receiving a PACCH ack(s) 741 from the target wireless device 604₃. For more details about this advantage, reference is made to the co-filed U.S. patent application Ser. No. 15/886,727 entitled "Notification of Delivery of a RRLP Multilateration Timing Advance Request Message to a Base Station Subsystem (BSS)" which claims the benefit of priority to U.S. Provisional Application Ser. Nos. 62/453,843 and 62/456,991, respectively filed on Feb. 2, 2017 and Feb. 9, 2017. The entire contents of each of these documents are hereby incorporated herein by reference for all purposes.

It should be appreciated that in the above described embodiments that these embodiments are exemplary and not mutually exclusive. For example, components from one embodiment may be tacitly assumed to be present in another embodiment and it will be obvious to a person skilled in the art how those components may be used in the other exemplary embodiments.

The exemplary embodiments described herein have been exemplified with Global System for Mobile telephony (GSM)/Enhanced Data rates for GSM Evolution (EDGE) as the communications network 600. The core network node 607 has been exemplified herein as being a Serving GPRS Support Node (SGSN) 607, but generally the core network node 607 may be any type of core network node that is serving the wireless device as well. For example, for NB-IoT the applicable core network node 607 may also be a Mobility Management Entity (MME). The radio access network node 602$_2$ (controller node 602$_2$) has been exemplified herein as being a BSS 602$_2$ but generally the radio access network node 602$_2$ may be any type of radio access network node 602$_2$ that is serving the wireless device as well. The positioning node 611 has been exemplified herein as being a SMLC node 611 but may, e.g., for NB-IoT be an Evolved Serving Mobile Location Center (E-SMLC) node 611.

It should further be noted that, to anyone skilled in the art, there are several realizations of the embodiments described herein with principally equivalent functionality where e.g., the introduced fields 720, 735 may be longer or shorter or even omitted, or durations may be longer or shorter. In addition, it should be noted that message names, parameters, and information elements may change during the course of the specification work, which implies the e.g., message names such as RRLP MULTILATERATION REQUEST message and RRLP Positioning Multilateration Timing Advance message shall be considered to be equivalent. This principle also applies to other messages, parameters, and information element names used herein so long as the principal use/function remain the same.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A Serving GPRS Support Node (SGSN) configured to interact with a Base Station Subsystem (BSS), the SGSN comprising:
    a processor; and,
    a memory that stores processor-executable instructions, wherein the processor interfaces with the memory to execute the processor-executable instructions, whereby the SGSN is operable to:
    receive, from the BSS, a BSS General Packet Radio Service (GPRS) Protocol (BSSGP) POSITION-COMMAND Protocol Data Unit (PDU) comprising (i) a Radio Resource Location Services (RRLP) Application Protocol Data Unit (APDU) with an embedded Radio Resource Location Services (RRLP) Multilateration Timing Advance (MTA) Request message for a target wireless device, and (ii) an indicator that the target wireless device is to perform a Multilateration Timing Advance procedure, wherein the indicator is a Multilateration Timer Information Element that includes an indication that the SGSN is to start a timer.

2. The SGSN of claim 1, wherein the SGSN is further operable to:
    use the indicator to suspend downlink data delivery and paging to the target wireless device when the target wireless device is expected to be unavailable due to performing the Multilateration Timing Advance procedure.

3. A method implemented by a Serving GPRS Support Node (SGSN) configured to interact with a Base Station Subsystem (BSS), the method comprising:
    receiving, from the BSS, a BSS General Packet Radio Service (GPRS) Protocol (BSSGP) POSITION-COMMAND Protocol Data Unit (PDU) comprising (i) a Radio Resource Location Services (RRLP) Application Protocol Data Unit (APDU) with an embedded Radio Resource Location Services (RRLP) Multilateration Timing Advance (MTA) Request message for a target wireless device, and (ii) an indicator that the target wireless device is to perform a Multilateration Timing Advance procedure, wherein the indicator is an Multilateration Timer Information Element that includes an indication that the SGSN is to start a timer.

4. The method of claim 3, further comprising:
    using the indicator to suspend downlink data delivery and paging to the target wireless device when the target wireless device is expected to be unavailable due to performing the Multilateration Timing Advance procedure.

5. A Base Station Subsystem (BSS) configured to interact with a Serving GPRS Support Node (SGSN), the BSS comprising:
   a processor; and,
   a memory that stores processor-executable instructions, wherein the processor interfaces with the memory to execute the processor-executable instructions, whereby the BSS is operable to:
   transmit, to the SGSN, a BSS General Packet Radio Service (GPRS) Protocol (BSSGP) POSITION-COMMAND Protocol Data Unit (PDU) comprising (i) a Radio Resource Location Services (RRLP) Application Protocol Data Unit (APDU) with an embedded Radio Resource Location Services (RRLP) Multilateration Timing Advance (MTA) Request message for a target wireless device, and (ii) an indicator that the target wireless device is to perform a Multilateration Timing Advance procedure, wherein the indicator is an Multilateration Timer Information Element that includes an indication that the SGSN is to start a timer.

6. A method implemented in a Base Station Subsystem (BSS) configured to interact with a Serving GPRS Support Node (SGSN), the method comprising:
   transmitting, to the SGSN, a BSS General Packet Radio Service (GPRS) Protocol (BSSGP) POSITION-COMMAND Protocol Data Unit (PDU) comprising (i) a Radio Resource Location Services (RRLP) Application Protocol Data Unit (APDU) with an embedded Radio Resource Location Services (RRLP) Multilateration Timing Advance (MTA) Request message for a target wireless device, and (ii) an indicator that the target wireless device is to perform a Multilateration Timing Advance procedure, wherein the indicator is an Multilateration Timer Information Element that includes an indication that the SGSN is to start a timer.

* * * * *